United States Patent [19]

Ford et al.

[11] Patent Number: 5,146,675
[45] Date of Patent: Sep. 15, 1992

[54] CYLINDRICAL ROLLER FOR A GLASS TEMPERING OVEN HAVING IMPROVED ENDS CAPS

[75] Inventors: George Ford, Fort Washington; Richard G. Ford, Ambler; Thomas J. Ford, Oreland, all of Pa.

[73] Assignee: George Ford & Sons, Inc., Philadelphia, Pa.

[21] Appl. No.: 711,808

[22] Filed: Jun. 7, 1991

[51] Int. Cl.⁵ .............................................. B21B 31/08
[52] U.S. Cl. ....................................... 29/123; 29/129
[58] Field of Search ................................... 29/123, 129

[56] References Cited

U.S. PATENT DOCUMENTS

| | | |
|---|---|---|
| 3,867,748 | 2/1975 | Miller . |
| 4,242,782 | 1/1981 | Hanneken et al. . |
| 4,399,598 | 8/1983 | Page et al. . |
| 4,404,011 | 9/1983 | McMaster . |
| 4,751,776 | 6/1988 | Reunamaki . |

Primary Examiner—P. W. Echols
Assistant Examiner—David P. Bryant
Attorney, Agent, or Firm—John F. A. Earley; John F. A. Earley, III

[57] ABSTRACT

A cylindrical roller apparatus for a glass tempering oven comprises a ceramic roller having a first end portion and a second end portion, a flat formed on each end portion of the roller, an end cap having a cylindrical wall mounted on each end portion of the roller, a metal retaining plate positioned on each flat, and a screw threaded through each end cap wall that screws into contact with the retaining plate for securing each end cap to the roller and for pushing the roller flush against the inner surface of the end cap wall. An acess hole can be provided in the end cap for welding together the screw, retaining plate, and end cap. Grooves can also be formed on the inner surface of the end cap, accessible through an opening formed through the end cap, to allow injection of adhesive between the roller and end cap to further secure the two together.

7 Claims, 2 Drawing Sheets

CYLINDRICAL ROLLER FOR A GLASS TEMPERING OVEN HAVING IMPROVED ENDS CAPS

BACKGROUND OF THE INVENTION

1. Field of the Invention

This invention relates to conveyor rollers used in glass tempering ovens, and more particularly concerns improved means for securing an end cap onto the conveyor roller.

2. Description of the Prior Art

Miller U.S. Pat. No. 3,867,748, which issued on Feb. 25, 1975 and which is incorporated herein by reference, discloses a conventional cylindrical ceramic conveyor roller for a glass tempering oven. FIG. 10 of U.S. Pat. No. 3,867,748 shows an end cap that is mounted onto a ceramic roller using an adhesive that is placed in cavities formed inside the end cap. A problem with this roller is that it tends to loosen from the end cap during use since the adhesive used to join the end cap to the ceramic roller begins to break down at about 600° F., well below the temperature of about 1300° F. that it is exposed to during use. As the adhesive breaks down in the end cap, the end cap starts to slip and starts to wear down the ceramic roller. Further, if the ceramic roller comes loose from the end cap, it may hit into and break other rollers in the oven. Also, as the roller becomes loose in the end cap, it begins to bounce, and by doing so it damages the glass rolling over it and leaves marks in the glass.

Another prior art roller attempted to solve the above problem of securing the end cap to the roller by drilling a pin into the side of the ceramic roller through the cylindrical end cap wall to secure the roller in place with respect to the end cap. However, this pin may cause fracturing of the roller.

SUMMARY OF THE INVENTION

It is an object of this invention to provide a cylindrical roller apparatus for use in conveyors in glass tempering ovens that has its end caps securely attached to its ceramic roller portion.

Another object of the invention is to provide a method of securing and properly aligning an end cap on a fused silica ceramic roller for a glass tempering oven.

These and other objects are accomplished by providing a cylindrical roller apparatus for a conveyor in a glass tempering oven that comprises a ceramic roller having a cylindrical wall with a first end portion and a second end portion, a first flat formed on the cylindrical wall of the first end portion of the roller, a second flat formed on the cylindrical wall of the second end portion of the roller, a first end cap mounted on the first end portion of the roller, a second end cap mounted on the second end portion of the roller, and means for securing the end caps on the end portions of the roller and for aligning the end-caps properly on the roller.

The securing and aligning means include a metal retaining plate positioned on each flat, and a set screw threaded through a threaded opening in the cylindrical wall of each end cap that screws into contact with the retaining plate for securing the end cap to the roller and for pushing the roller flush against the inner surface of the end cap wall.

Each end cap is provided with an access opening extending through the end cap wall adjacent to the threaded opening for the screw to provide access to where the screww contacts the retainig plate to permit the screw, retaining plate, and a portion of the end cap to be welded together.

Each end cap is also provided with holes that lead to annular grooves formed on the inner surface of the cylindrical wall of the end cap so that an adhesive may be injected through the holes into the annular grooves to aid in securing the end cap to the roller.

The inventive method of securing and properly aligning an end cap on a fused silica ceramic roller for a glass tempering oven includes the steps of machining a flat on the outer circumference of the cylindrical wall of the end portion of the roller, placing a retaining plate on the flat to distribute pressure subsequently applied to the retaining plate over the area of the flat, placing an end cap over the end portion of the roller, and attaching the end cap to the end portion of the roller with a screw extending through a threaded opening in the end cap wall into contact with the retaining plate to apply pressure against the retaining plate to affix the end cap to the end portion of the roller and to push the roller flush against the inner surface of the cylindrical wall of the end cap to properly align the end cap on the end portion of the roller.

After the screw is tightened against the retaining plate, the screw, retaining plate, and a portion of the end cap wall are welded together.

Further, an adhesive is applied between the roller and the inner surface of the cylindrical wall of the end cap to aid in securing the end cap to the roller.

DETAILED DESCRIPTION

Figure 1:
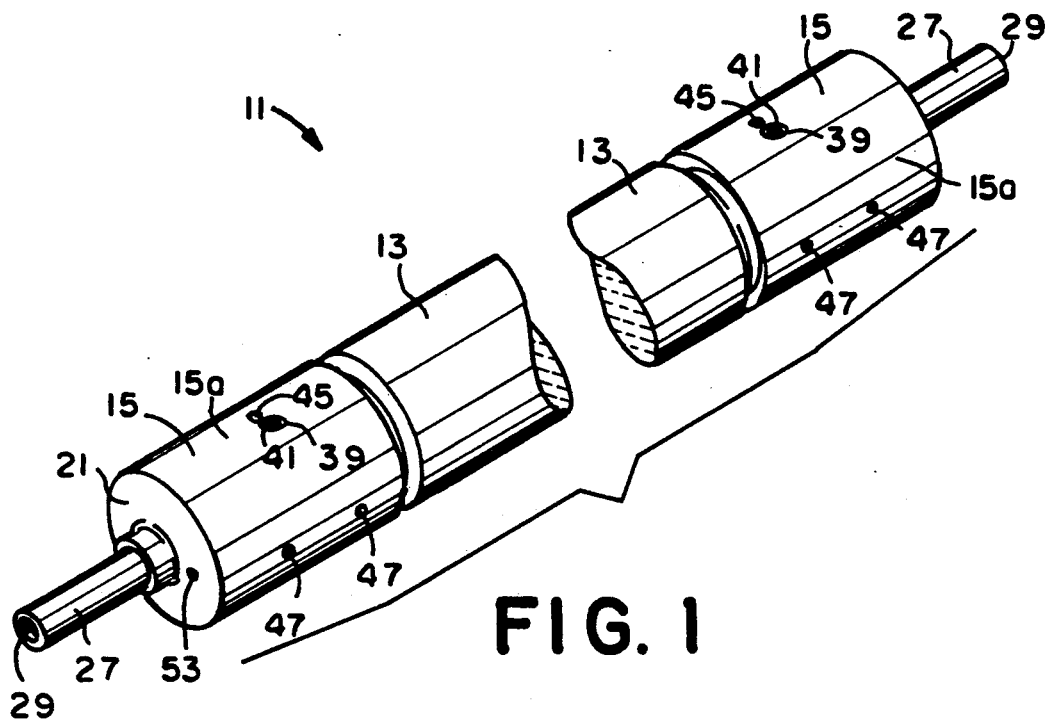
FIG. 1 is a perspective view of a cylindrical roller apparatus for a conveyor in a glass tempering oven constructed in accordance with this invention.
Figure 2:
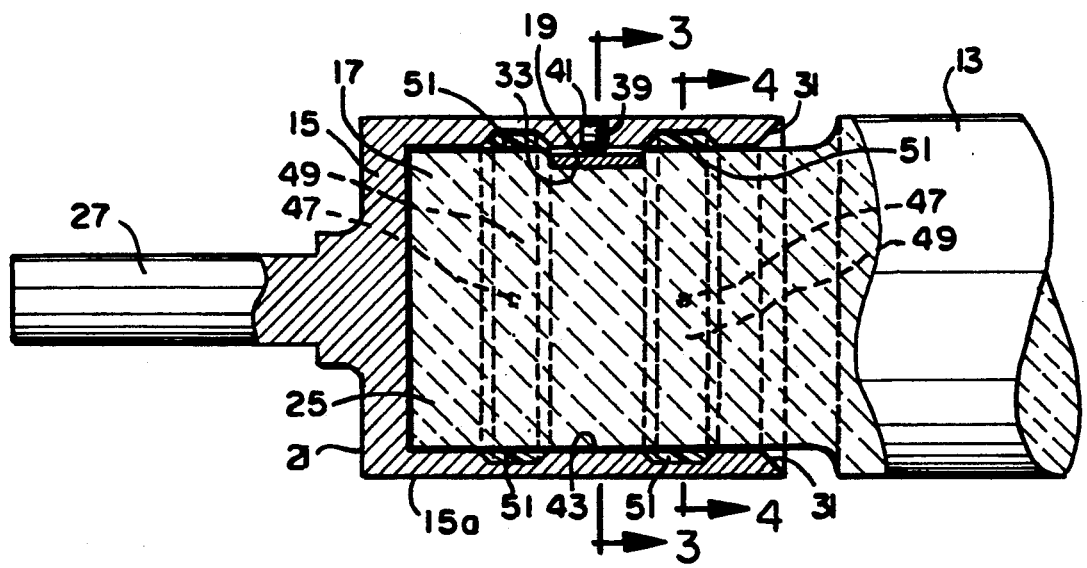
FIG. 2 is a partial view in section showing an end cap mounted on an end portion of a ceramic roller.

Turning now to the drawings, there is shown in FIGS. 1 and 2 a cylindrical roller apparatus 11 for a glass tempering oven which comprises a cylindrical ceramic roller 13, a pair of end caps 15 mounted on each reduced end portion 17 of roller 13, and means for securing the end caps 15 on the end portions 17 of the roller 13 and for aligning the end caps 15 properly on the roller 13.

Figure 3:
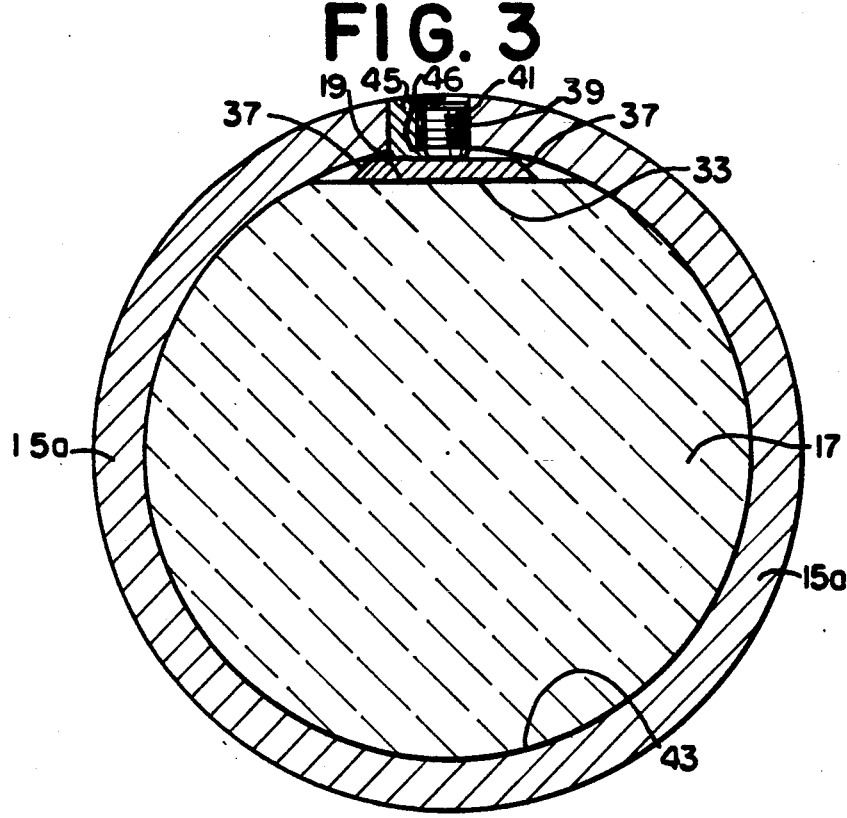
FIG. 3 is a view in cross section taken along the lines and arrows 3—3 of FIG. 2.
Figure 4:
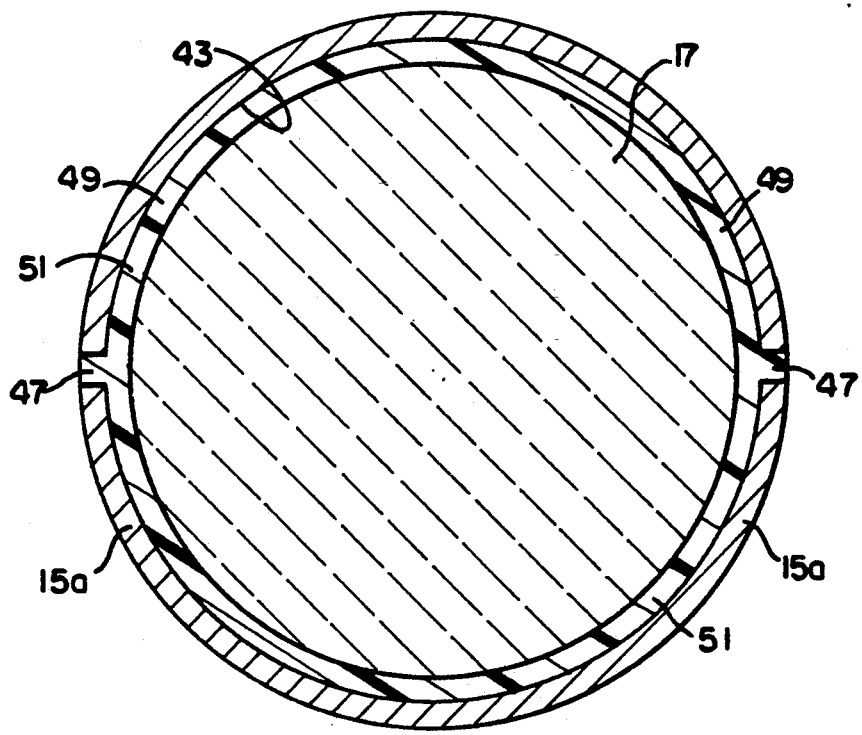
FIG. 4 is a view in cross section taken along the lines and arrows 4—4 of FIG. 2.

Referring to FIGS. 2 and 3, each end portion 17 of roller 13 is sized to fit snugly inside an end cap 15 having a cylindrical wall 15a, and each end portion 17 has a flat 19 formed in it.

As shown in FIG. 2, each end cap 15 has a base portion 21 and a cylindrical side wall 15a which extends away from the base portion 21 and forms a chamber 25 that receives an end portion 17 of roller 13. Each end cap 15 is also provided with a supporting shaft 27 that extends axially outwardly from base portion 21 of end cap 15. Supporting shaft 27 includes a threaded bore 29 that is adapted to receive a threaded rod from a support frame of a glass tempering oven and/or the drive means of the glass tempering oven. End cap 15 is provided at the open end of its cylindrical wall 15a with a rounded or radiused rim 31 to reduce stress between the end cap 15 at its rim 31 and the corresponding portion of the roller 13. Radiused rim 31 also facilitates insertion of end cap 15 onto roller end portion 17 since the radiused rim helps guide the end cap 15 onto the roller end portion 17.

Securing and aligning means are shown especially in FIGS. 2 and 3. A metal retaining plate or key 33 is positioned on each flat 19. Retaining plate 33 preferably has a square or rectangular shape, and has chamfered edge portions 37 so that it does not interfere with the insertion of end cap 15 onto roller end portion 17.

A threaded hole 39 is provided in cylindrical wall 15a of each end cap 15, and a headless socket screw 41 is provided in each threaded hole 39. Screw 41 is adapted to be tightened down into contact with retaining plate 33 for securing the end cap 15 to the roller 13 and for pushing the roller 13 flush against the inner surface 43 of the cylindrical wall 15a of end cap 15.

As shown in FIGS. 1 and 3, an access opening or hole 45 is provided in the wall 15a of each end cap 15 next to threaded hole 39, and access opening 45 extends through end cap wall 15a to provide access to where screw 41 contacts retaining plate 33 to permit screw 41, retaining plate 33, and a portion of the end cap wall 15a to be welded together, to form a weld 46.

The purpose of the weld is to secure screw 41 in hole 39 and tightly against retaining plate 33 and to prevent screw 41 from backing out of hole 39. Other equivalent means for securing screw 41 in hole 39 and preventing screw 41 from loosening are possible, such as jamming another screw onto the top of screw 41 to prevent screw 41 from backing out of hole 39, applying a chemical thread-locking compound to prevent the screw 41 from backing out of hole 39, damaging the remaining threads of hole 39 not engaged by screw 41 after screw 41 is in place in hole 39 to prevent screw 41 from backing out of hole 39, or securing a nut to the outer end portion of screw 41 to lock screw 41 in place.

Optionally, holes 47 are provided in each end cap wall 15a which lead to annular grooves 49 formed on inner surface 43 of end cap wall 15a, and an appropriate adhesive 51, such as RTV 60 silicone rubber, may be injected through holes 47 into grooves 49 to aid in securing the end cap 15 to roller 13. In the preferred embodiment of the invention, two holes 47 are provided on opposite sides of the wall 15a for each groove 49.

An air escape hole 53 (FIG. 1) is provided in the base portion 21 so that air may escape from inside the end cap 15 as end cap 15 is slid onto roller 13.

The method of securing and properly aligning the end cap 15 on the fused silica ceramic roller 13 comprises the steps of machining a flat 19 onto the outer circumference of the end portion 17.

Retaining plate 33 is then positioned on flat 19 to distribute any pressure subsequently applied to the retaining plate 33 over the area of the flat 19.

End cap 15 is then slid over roller end portion 17 so that the end of roller 13 abuts against the inner surface of base portion 21 of end cap 15, and threaded hole 39 and headless socket screw 41 are aligned above retaining plate 33.

The end cap 15 is attached to the end portion 17 of roller 13 by turning screw 41 into contact with the retaining plate 33 to apply pressure against the retaining plate 33. By turning screw 41 into tight contact against retaining plate 33, end cap 15 is secured to roller end portion 17, and roller 13 is pushed flush against the inner surface 43 of end cap wall 15a to properly align end cap 15 on end portion 17 of roller 13 without the roller end portion 17 being canted in the end cap 15.

Then, screw 41 is secured in place such as by welding screw 41, retaining plate 33, and a portion of end cap wall 15a together via access opening 45. After the screw 41, the retaining plate 33, and a portion of the end cap wall 15a are welded together, access opening 45 is filled with weld material. Any hardened weld material extending outwardly from access opening 45 is ground down to be even with the outside diameter of end cap wall 15a and provide a smooth outer surface to end cap wall 15a.

Adhesive 51 is applied between roller 13 and the inner surface 43 of end cap 15 to aid in securing end cap 15 to roller 13 by injecting the adhesive 51 through holes 47 formed in end cap wall 15a into the annular grooves 49 formed in the inner surface 43 of end cap wall 15a.

End cap 15 described herein, with its supporting shaft 25, is exemplatory of one type of end cap of the invention. Other end caps known in the art may be modified to be in accordance with the invention.

ADVANTAGES

Unlike the apparatus of prior art rollers where a pin was drilled into the ceramic roller from the side of the end cap to secure the roller in place with respect to the end cap, pressure applied by screw 41 of our invention is distributed over an area defined by retaining plate 33 over flat 19, rather than being distributed merely over a point as in the prior art. Accordingly, roller 13 is less likely to fracture than the roller used in the prior art.

Also, unlike the known rollers that have their end caps secured to their rollers with just an adhesive, our rollers 13 do not tend to loosen from our end caps 15 during use due to the excessive heat of the glass tempering ovens since the end caps 15 of our invention are mechanically secured to the roller by tightening down screw 41 tightly against retaining plate 33 and then welding together the tightened screw 41, the retaining plate 33, and a portion of the end cap 15. Our roller 13 stays secure in our end cap 15, and, accordingly, the risk of our roller 13 becoming loose and beginning to bounce or to become completely detached from our end cap 15 is greatly reduced.

We claim:

1. A cylindrical roller apparatus for a glass tempering oven comprising
   a ceramic roller having a first end portion and a second end portion,
   a first flat formed on the first end portion of the roller,
   a second flat formed on the second end portion of the roller,
   a first end cap having a cylindrical wall mounted on the first end portion of the roller,
   a second end cap having a cylindrical wall mounted on the second end portion of the roller, and
   means for securing the end caps on the end portions of the roller and for aligning the end caps properly on the roller,
   said securing and aligning means including
   a metal retaining plate positioned on each flat, and
   a screw threaded through each end cap wall that screws into contact with the retaining plate for securing the end cap to the roller and for pushing the roller flush against the inner surface of the end cap wall.

2. The roller apparatus of claim 1, each end cap wall being provided with an access opening extending through the end cap wall adjacent to the screw to provide access to where the screw contacts the retaining plate to permit the screw, retaining plate, and a portion of the end cap wall to be welded together, and a weld connecting together the screw, retaining plate, and end cap wall.

3. The roller apparatus of claim 1, each end cap being provided with a hole extending through the end cap wall, said hole leading to a groove formed in the inner surface of the end cap wall, whereby an adhesive may be injected through the hole into the groove, said adhesive aiding in securing the end cap to the roller, and adhesive in the groove connecting the end cap to the roller.

4. A cylindrical roller apparatus for a glass tempering oven comprising a ceramic roller having a first end portion and a second end portion, a first flat formed on the first end portion of the roller, a first end cap having a cylindrical wall mounted on the first end portion of the roller, and a first securing and aligning means for securing the first end cap on the first end portion of the roller and for aligning the first end cap properly on the roller, said first securing and aligning means including a first metal retaining plate positioned on the first flat, and a first screw threaded through the first end cap wall that screws into contact with the first retaining plate for securing the first end cap to the roller and for pushing the roller flush against the inner surface of the first end cap wall, a second flat formed on the second end portion of the roller, a second end cap having a cylindrical wall mounted on the second end portion of the roller, and a second securing and aligning means for securing the second end cap on the second end portion of the roller and for aligning the second end cap properly on the roller, said securing and aligning means including a second metal retaining plate positioned on the second flat, and a second screw threaded through the second end cap wall that screws into contact with the second retaining plate for securing the second end cap to the roller and for pushing the roller flush against the inner surface of the second end cap wall, said first end cap wall being provided with an access opening extending through the first end cap wall adjacent to the first screw to provide access to where the first screw contacts the first retaining plate to permit the first screw, the first retaining plate, and a portion of the first end cap wall to be welded together, a first weld connecting the first screw, the first plate, and the first end cap wall, said second end cap wall being provided with an access opening extending through the second end cap wall adjacent to the second screw to provide access to where the second screw contacts the second retaining plate to permit the second screw, the second retaining plate, and a portion of the second end cap wall to be welded together, a second weld connecting the second screw, the second plate, and the second end cap wall, the first end cap being provided with a first hole extending through the first end cap wall, said first hole leading to a first groove formed in the inner surface of the first end cap wall, whereby an adhesive may be injected through the first hole into the first groove, said adhesive aiding in securing the first end cap to the roller, adhesive in said first groove connecting the first end cap to the roller, the second end cap being provided with a second hole extending through the second end cap wall, said second hole leading to a second groove formed in the inner surface of the second end cap wall, whereby an adhesive may be injected through the second hole into the second groove, said adhesive aiding in securing the second end cap to the roller, and adhesive in the second groove connecting the second end cap to the roller.

5. A cylindrical roller apparatus for a glass tempering oven comprising a ceramic roller having a first end portion and a second end portion, a flat formed on the first end portion of the roller, an end cap having a cylindrical wall mounted on the first end portion of the roller, and securing and aligning means for securing the end cap on the first end portion of the roller and for aligning the end cap properly on the roller, said securing and aligning means including a metal retaining plate positioned on the flat, and a screw threaded through the end cap wall that screws into contact with the retaining plate for securing the end cap to the roller and for pushing the roller flush against the inner surface of the end cap wall.

6. The roller apparatus of claim 5, said end cap wall being provided with an access opening extending through the end cap wall adjacent to the screw to provide access to where the screw contacts the retaining plate to permit the screw, retaining plate, and a portion of the end cap wall to be welded together, and a weld connecting together the screw, retaining plate, and end cap wall.

7. The roller apparatus of claim 5, the end cap being provided with a hole extending through the end cap wall, said hole leading to a groove formed in the inner surface of the end cap wall, whereby an adhesive may be injected through the hole into the groove, said adhesive aiding in securing the end cap to the roller, and an adhesive in the groove connecting the end cap to the roller.

* * * * *